United States Patent [19]

Cox et al.

[11] 4,388,639

[45] Jun. 14, 1983

[54] COLOR CONTROL CIRCUIT FOR TELETEXT-TYPE DECODER

[75] Inventors: Charles M. Cox, Buffalo Grove; Rudolf Turner, Vernon Hills, both of Ill.

[73] Assignee: Zenith Radio Corporation, Glenview, Ill.

[21] Appl. No.: 264,773

[22] Filed: May 18, 1981

[51] Int. Cl.³ .............................................. H04N 9/535
[52] U.S. Cl. ...................................... 358/27; 358/147; 340/701
[58] Field of Search .................. 358/21 R, 22, 27, 40, 358/147; 340/701, 703, 704, 723, 744, 748, 750, 793

[56] References Cited

FOREIGN PATENT DOCUMENTS 2803746 10/1978 Fed. Rep. of Germany ...... 340/701
55-20517 2/1980 Japan .................................... 340/703

OTHER PUBLICATIONS

Radio Shack, *Dictionary of Electronics*, 1974-1975 Edition, pp. 120, 509.

Primary Examiner—John C. Martin
Attorney, Agent, or Firm—Jack Kail

[57] ABSTRACT

A color control circuit for selectively modifying the red, green and blue color signals developed at the output of a teletext-type decoder comprises a common input stage responsive to the teletext decoder for developing a bi-level control voltage identifying the portions of the color signals representing background and foreground display information. Each color signal is coupled to a respective output stage which causes the associated color signal to assume a first intensity level in response to the control voltage being at its first level and a second intensity level greater than the first intensity level in response to the control voltage being at its second level. As a result, background colors are displayed at a reduced contrast level relative to foreground colors. In addition, selected single color foreground information may be displayed at a further increased intensity level to improve the readability of the display.

5 Claims, 3 Drawing Figures

COLOR CONTROL CIRCUIT FOR TELETEXT-TYPE DECODER

BACKGROUND OF THE INVENTION

The present invention relates generally to teletext type communications systems and, more particularly, to improvements in the video displays produced by such systems.

Teletext is a generic term for a new and rapidly growing television based communications technique which uses the vertical blanking interval of a broadcast television signal for transmission of text and graphics information. Systems implementing this technique are presently operational in various countries, such as in England where teletext formatted text and graphics material is transmitted in digitally encoded form on lines 17, 18, 330 and 331 of their 625 line system. Television receivers equipped with teletext decoders process the transmitted data for forming a display on a CRT of the text and graphics information. The teletext decoder conventionally includes means for acquiring and storing a selected page of transmitted teletext data, the stored teletext encoded information being applied to a display generator for synthesizing R, G, B video character signals suitable for driving the CRT of the television receiver for producing a display reflecting the stored data. In addition, a so-called Y signal is developed by the teletext decoder to facilitate a mixed mode operation of the television receiver wherein the teletext characters are superimposed on the CRT screen over the normal video image produced in response to the broadcast television signal. In order to accomplish the foregoing, the Y signal assumes a first logic state in time coincidence with the development of a R, G or B teletext character signal (sometimes referred to as a foreground portions of the display) and otherwise assumes a second logic state, (i.e., during background portions of the display.

The video image display produced on the CRT of a television receiver in response to a conventional teletext decoder has been found to have certain undesirable limitations. For example, a blue foreground text/graphics characters cannot be displayed on a blue background since both are produced at the same intensity and are therefore indistinguishable from each other. In addition, foreground text/graphics characters when displayed in certain colors to which the human eye is relatively insensitive, e.g., red and blue, are extremely difficult to read.

It is, therefore, a basic object of the present invention to provide a technique for improving the video image display produced on the CRT of a television receiver in response to a conventional teletext-type decoder.

It is a more specific object of the invention to provide a technique for improving the video image display produced on the CRT of a television receiver in response to a conventional teletext-type decoder by displaying the foreground text/graphics characters at a different intensity level than the background portions of the display.

It is a further object of the invention to provide a technique for improving the video image display produced on the CRT of a television receiver in response to a conventional teletext type decoder by increasing the relative intensity of the text/graphics characters displayed in selected colors.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the several figures and in which:

DESCRIPTION OF THE PREFERRED EMBODIMENT

For purposes of an exemplary showing, the present invention will hereinafter be described in terms of an improved video display system using teletext communications techniques according to the British teletext transmission standards as set forth in British Broadcast Teletext Specification, September, 1976. It will be appreciated, however, that these particular standards are in no way intended to limit the scope of the invention which, in general, may be practiced in association with any teletext type communications system wherein digitally encoded data is transmitted on one or more unused lines of the vertical blanking interval of a broadcast television signal. Thus, numerous changes to the British teletext format may be made without affecting the scope of the invention.

According to the foregoing British standards, each teletext line of the vertical interval, i.e., horizontal scanning lines 17, 18, 330 and 331 in the 625 line British system, is encoded with 360 serially transmitted bits arranged in 45 eight bit bytes and commonly referred to as a data row. Twenty four data rows comprise a page which represents the amount of information normally displayed on the viewing screen of a television receiver equipped with a teletext decoder. Each eight bit character byte comprises an ASCII-like code representing a selected text/graphics character and also defining the color in which the character is to be displayed, each text/graphics character so defined being intended for display on the viewing screen of the television receiver as foreground information.

Figure 1:
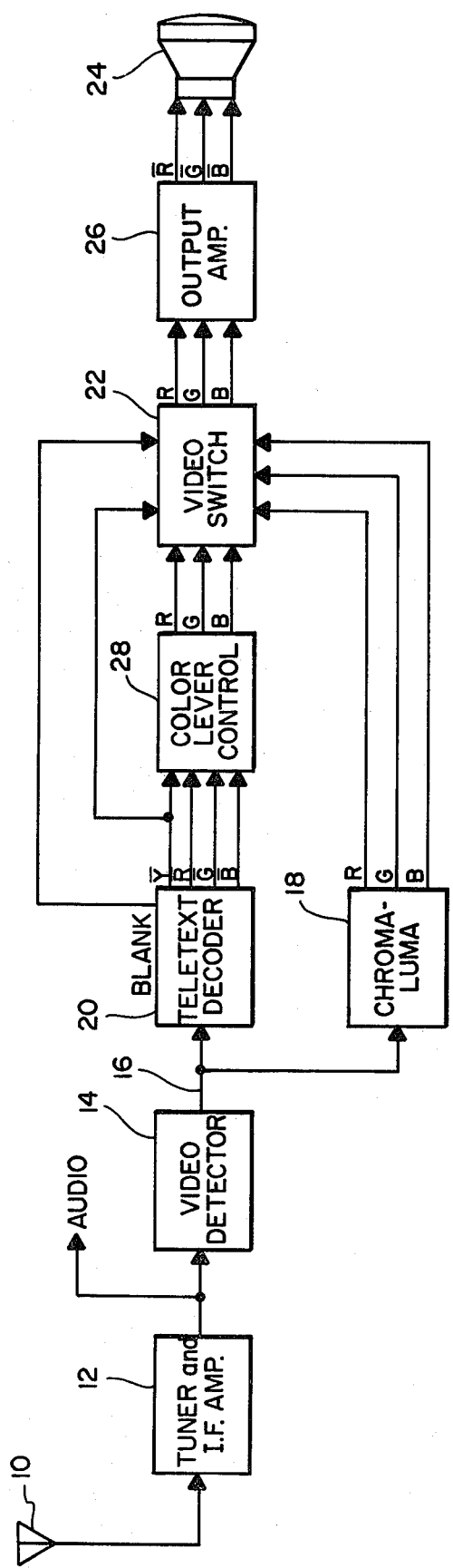
FIG. 1 is a block diagram generally illustrating a circuit for implementing the techniques of the present invention.

A television receiver including a conventional teletext decoder adapted for acquiring and displaying a selected page of the transmitted teletext data base is illustrated in FIG. 1. See, for example, Mullard Technical Information Note 54 (Mullard Ltd., Mullard House, Torrington Place, London WC1E7HD) in which this teletext circuitry is described in great detail. The television receiver includes an antenna 10 for intercepting and coupling the broadcast teletext encoded television signal to a tuner and IF amplifier stage 12, stage 12 being adapted for converting the received signal to an intermediate frequency (IF) signal which is coupled to the audio section of the receiver (not shown) and also to a video detector stage 14. Video detector stage 14 develops a corresponding composite baseband video signal on an output conductor 16, which video baseband signal is coupled to a conventional chroma-luma stage 18 and also to the input of a conventional teletext decoder 20. Chroma-luma stage 18 operates in a conventional manner for developing R, G, B output signals representing the normal video image televised during the active scanning intervals of the broadcast television signal, these R, G, B output signals being coupled to a video switch 22 whose output supplies the CRT 24 of the television receiver through a suitable output amplification stage 26. When video switch 22 is operated for coupling the R, G, B output signals developed by chroma-luma stage 18 to CRT 24, the television receiver is operated in its normal mode wherein a color video image is displayed on the viewing screen corresponding to the normally broadcast television signal. The transmitted teletext data will not contribute to the display in this mode since it is encoded in the vertical blanking interval of the television signal.

Teletext decoder 20 is operable in a conventional manner for developing $\overline{R}, \overline{G}, \overline{B}$ output signals representing the text/graphics characters corresponding to a page of acquired and stored teletext encoded signals. In addition, teletext decoder 20 conventionally develops another output signal $\overline{Y}$ which defines the foreground portions of the $\overline{R}, \overline{G}, \overline{B}$ output signals. The state that $\overline{Y}=1$ therefore defines the background portions of the display image while the state $\overline{Y}=0$ defines the foreground text/graphics character portions of the display. Normally, the $\overline{R}, \overline{G}, \overline{B}$ signals developed at the output of teletext decoder 20 are coupled to a second data input of video switch 22 (normally in an inverted form) while the $\overline{Y}$ signal together with a blanking signal developed at the output of the decoder are coupled to respective control inputs of video switch 22. Video switch 22 is operable in a second mode for coupling only the R, G, B signals derived from the output of teletext decoder 20 to CRT 24, in which case the television receiver is operated in a teletext mode wherein a color video image is displayed on the viewing screen corresponding to the encoded teletext text/graphics characters stored in teletext decoder 20. In a third mode of operation, commonly referred to as a mixed mode, video switch 22 is effective for coupling the R, G, B signals derived from both chroma-luma stage 18 and teletext decoder 20 to CRT 24. In this mode of operation, the $\overline{Y}$ signal developed at the output of teletext decoder 20 is effective for causing video switch 22 to inhibit the transmission of background signals derived from teletext decoder 20 so that the teletext information may be superimposed over the normal television picture. In addition, the $\overline{Y}$ signal will cause video switch 20 to inhibit the transmission of the R, G, B signals derived from the output of chroma-luma stage 18 during the character display times, i.e., during the foreground portions of the video image, to prevent color contamination thereof. As will be explained in further detail below, in accordance with the present invention a teletext color level control circuit 28 is interposed between teletext decoder 20 and video switch 22, color level control 28 being operable for selectively modifying the $\overline{R}, \overline{G}, \overline{B}$ signals developed at the output of teletext decoder 20 for providing an improved video display image corresponding to the teletext encoded text/graphics characters stored in decoder 20.

Figures 2, 3:
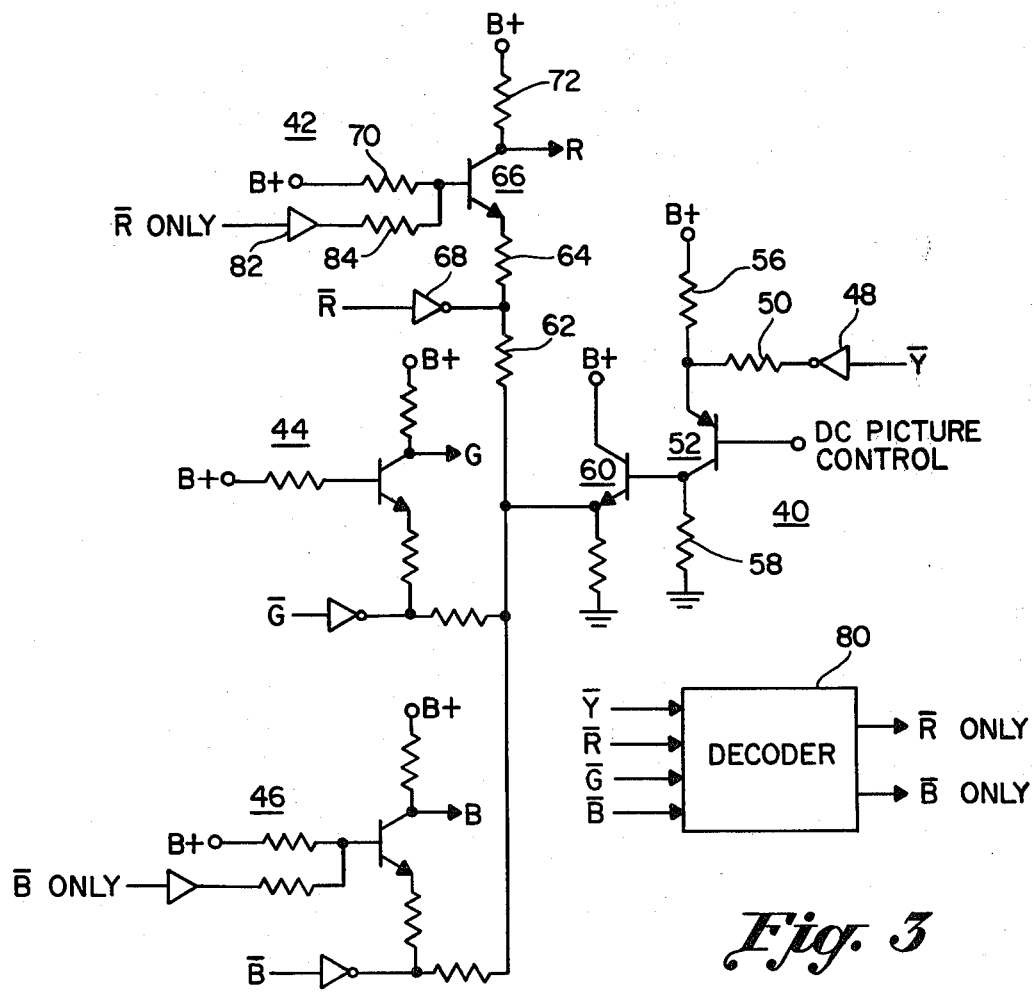
FIG. 2 is a graphical depiction of various signal waveforms produced at the output of a conventional teletext decoder and the display produced on the CRT of a television receiver in response thereto.
FIG. 3 is an electrical schematic diagram showing the teletext color level control of FIG. 1.

FIG. 2 illustrates in a simplified manner the relationship between the $\overline{R}, \overline{G}, \overline{B}$ and $\overline{Y}$ signals produced at the output of teletext decoder 20 and the resulting video display produced on the viewing screen of CRT 24. For purposes of this example, it is assumed that the video image produced on the viewing screen of the CRT comprises a blue background and a foreground consisting of a red color bar 30, a green color bar 32 and a blue color bar 34, the color bars representing teletext encoded characters. The $\overline{R}, \overline{G}, \overline{B}$ and $\overline{Y}$ signals shown below this video image correspond to a single horizontal scanning line 36 extending through the three color bars. Thus, since the $\overline{R}$ signal, or its inverse R, is applied to the red gun of the CRT, this signal is logically high during all of the horizontal line 36 except when red color bar 30 is being traced, during which time interval the $\overline{R}$ signal goes logically low for operating the red gun. Similarly, since the $\overline{G}$ signal, or its inverse G, is applied to the green gun of the CRT, this signal is logically high during all of horizontal line 36 except when green color bar 32 is being traced, during which time interval the $\overline{G}$ signal goes logically low for operating the green gun. Since the viewing screen background is blue, the $\overline{B}$ signal is logically low for all of horizontal line 36 except during the intervals when the red and green color bars 30 and 32 are being traced. As a consequence, the blue gun is continuously operated except during the time intervals during which color bars 30 and 32 are being traced. As can be seen from the Figure, the $\overline{Y}$ signal is logically high during the background portion of the display image and logically low during the foreground portions of the display, thereby distinguishing the foreground from the background. In this regard, it will be observed that the foreground blue color bar 34 will be indistinguishable from the background blue video image since the blue electron gun of the CRT is being operated in both instances in response to the same level blue input drive signal. This problem is overcome according to the present invention through the use of color level control 28 which causes the color of all background portions of the display image to be produced at a lower intensity level than the color of the foreground portions. Thus, with reference to FIG. 2, the blue background portions of the display image will be produced at a lower intensity level than the blue color bar 34 which will therefore be clearly distinguishable from each other. In addition, and according to another aspect of the invention, the display image is further enhanced by color level control 28 by increasing the intensity level of foreground characters which are red only or blue only in color.

Color level control circuit 28 is shown in detail in FIG. 3. The circuit comprises a common input stage 40 whose output is applied to a red stage 42, a green stage 44 and a blue stage 46. In the input stage 40, the $\overline{Y}$ signal developed at the output of teletext decoder 20 is coupled through an inverter 48 and resistor 50 to the emitter of a transistor 52, the emitter of transistor 52 being connected through a resistor 56 to supply potential B+. The base of transistor 52 is supplied with a viewer adjustable DC picture control potential, the collector of the transistor being connected to ground through a resistor 58. The collector of transistor 52 is also connected to the base of an emitter follower transistor 60 whose output comprises the output of input stage 40. In operation, when the $\overline{Y}$ signal is logically high, representing a background portion of the display image, the output voltage developed at the emitter of transistor 60 will be low. On the other hand, when the $\overline{Y}$ signal is logically low, representing a foreground character portion of the display image, the output voltage developed at the emitter of transistor 60 will be high. In either case, the precise value of the output voltage can be adjusted to a desired level by suitably varying the DC picture control voltage supplied to the base of transistor 60.

The output voltage developed at the emitter of transistor 60 is coupled to each of the stages 42, 44 and 46. For example, with reference to stage 42, the voltage developed at the emitter of transistor 60 is coupled through a pair of resistors 62 and 64 to the emitter of a transistor 66. In addition, the $\overline{R}$ signal developed at the output of teletext decoder 20 is coupled through an inverter 68 to the junction formed between resistors 62 and 64. The base and collector electrodes of transistor 66 are coupled through a pair of resistors 70 and 72 to supply potential B+, the collector of transistor 66 developing the R signal coupled to video switch 22 for driving the red gun of CRT 24. In operation, assume that a bakground portion of the display image is being traced so that the $\overline{Y}$ signal is logically high and the output voltage developed at the emitter of transistor 60 is low. If, at the same time, the $\overline{R}$ signal is logically high, indicating that there is no red color component in the background display, the junction between resistors 62 and 64 will be logically low causing transistor 66 to conduct heavily whereby the R signal will be characterized by a reduced voltage representing black level. If, on the other hand, the $\overline{R}$ signal is logically low, indicating that there is a red color component in the background display, the junction between resistors 62 and 64 will be logically high causing transistor 66 to conduct less heavily such that the R signal is characterized by an increased voltage representing a first intensity level.

Next, assume that a character portion of the display image is being traced so that the $\overline{Y}$ signal is logically low and the output voltage developed at the emitter of transistor 60 is logically high. If, at the same time, the $\overline{R}$ signal is logically high, indicating that there is no red color component in the character being traced, the junction between resistors 62 and 64 will be logically low causing the R signal to assume the black level voltage. However, if the $\overline{R}$ signal is logically high, indicating that there is a red color component of the character being traced, the junction between resistors 62 and 64 will go logically high and, together with the logically high voltage developed at the emitter of transistor 60, will reduce the conduction of transistor 66 to a point where the R signal is characterized by a voltage representing a second intensity level greater than the previously mentioned first intensity level. As a consequence, the intensity of a red background will be less than the intensity of a red character enabling the two to be distinguished from each other. Since stages 44 and 46 are identical to stage 42, stage 44 being responsive to the $\overline{G}$ signal and stage 46 being responsive to the $\overline{B}$ signal, the operation of these stages will not be explained in detail.

Color level control circuit 28 further comprises a decoder 80, e.g., part number 74LS42 manufactured by Texas Instruments, responsive to the $\overline{R}, \overline{G}, \overline{B}$ and $\overline{Y}$ signals for developing a $\overline{R}$ only and a $\overline{B}$ only output signal. The $\overline{R}$ only signal is logically low when a character is being traced comprising only a red color component and is otherwise logically high. In a similar manner, the $\overline{B}$ only signal is logically low when a character is being traced comprising only a blue color component and is otherwise logically high. The $\overline{R}$ only signal is applied through a buffer amplifier 82 and a resistor 84 to the base of transistor 66, the $\overline{B}$ only signal being similarly coupled to stage 46. As a result, when a traced character is characterized by a red color component only, the logically low $\overline{R}$ only signal reduces the voltage at the base of transistor 66 causing it to conduct even less heavily than before and increasing the voltage of the R signal to a third level representing an intensity greater than the previously mentioned first and second intensity levels, a similar result being achieved for characters comprising only a blue color component. As a result, pure red and pure blue characters, which are normally difficult to read, are displayed at an increased intensity level.

While a particular embodiment of the invention has been shown and described, it will be obvious to those skilled in the art that changes and modifications may be made without departing from the invention in its broader aspects. For example, the $\overline{R}, \overline{G}, \overline{B}$ and $\overline{Y}$ signals could be processed in a somewhat similar manner for distinguishing between background and foreground portions of the video display by desaturating the background video image through the addition of a white level signal rather than by reducing the intensity levels of the background color signals. As used herein, the term contrast encompases changes in both color intensity and saturation. The aim of the appended claims, therefore, is to cover all such changes and modifications as fall within the true spirit and scope of the invention.

We claim:

1. A color control circuit for selectively modifying the red, green and blue color signals developed at the output of a teletext-type decoder, said teletext-type decoder further developing a bi-level output control signal identifying the portions of said color signals representing background and foreground display information, said color control circuit comprising:

means responsive to said bi-level output control signal for developing at a common circuit node a control voltage having a first level identifying portions of said color signals representing background display information and a second level identifying portions of said color signals representing foreground display information; and output means comprising a red output stage, a green output stage and a blue output stage, each of said output stages summing the control voltage developed at said common circuit node with the corresponding one of said red, green and blue color signals for causing the respective color signal to assume a first intensity level when the control voltage developed at said common circuit node is at said first level and a second intensity level greater than said first intensity level when the control voltage developed at said common circuit node is at said second level.

2. A color control circuit for selectively modifying the red, green and blue color signals developed at the output of a teletext-type decoder, said teletext-type decoder further developing a bi-level output control signal identifying the portions of said color signals representing background and foreground display information, said color control circuit comprising:

means responsive to said bi-level output control signal for developing at a common circuit node a control voltage having a first level identifying portions of said color signals representing background display information and a second level identifying portions of said color signals representing foreground display information;

output means comprising a red output stage, a green output stage and a blue output stage, each of said output stages summing the control voltage developed at said common circuit node with the corresponding one of said red, green and blue color signals for causing the respective color signal to assume a first intensity level when the control voltage developed at said common circuit node is at said first level and a second intensity level greater than said first intensity level when the control voltage developed at said common circuit node is at said second level;

means responsive to said teletext-type decoder for developing an identification signal identifying the portions of at least one of said color signals representing single color foreground display information; and means for coupling said identification signal to the corresponding one of said output stages for causing the corresponding color signal to assume a third intensity level greater than said second intensity level.

3. A color control circuit for selectively modifying the red, green and blue color signals developed at the output of a teletext-type decoder, said teletext-type decoder further developing a bi-level output control signal identifying the portions of said color signals representing background and foreground display information, said color control circuit comprising:

means responsive to said bi-level output control signal for developing at a common circuit node a control voltage having a first level identifying portions of said color signals representing background display information and a second level identifying portions of said color signals representing foreground display information; and output means comprising first, second and third transistor means each including an emitter terminal coupled for receiving the control voltage developed at said common circuit node and a respective one of said color signals, each of said transistor means being operated for processing its respective color signal by causing it to assume a first intensity level when the control voltage developed at said common circuit node is at said first level and a second intensity level greater than said first intensity level when the control voltage developed at said common circuit node is at said second level.

4. A color control circuit for selectively modifying the red, green and blue color signals developed at the output of a teletext-type decoder, said teletext-type decoder further developing a bi-level output control signal identifying the portions of said color signals representing background and foreground display information, said color control circuit comprising:

means responsive to said bi-level output control signal for developing at a common circuit node a control voltage having a first level identifying portions of said color signals representing background display information and a second level identifying portions of said color signals representing foreground display information;

means responsive to said teletext-type decoder for developing an identification signal identifying the portions of at least one of said color signals representing single color foregound display information; and output means comprising first, second and third transistor means each including an emitter terminal coupled for receiving the control voltage developed at said common circuit node and a respective one of said color signals with said identification signal being coupled to the base terminal of the corresponding transistor means, each of said transistor means being operated for processing its respective color signal by causing it to assume a first intensity level when the control voltage developed at said common circuit node is at said first level and a second intensity level greater than said first intensity level when the control voltage developed at said common circuit node is at said second level, the conduction of the transistor means receiving said identification signal being reduced in response thereto for causing the corresponding color signal to assume a third intensity level greater than said second intensity level.

5. A color control circuit according to claim 4 including user-operable means for developing a picture control signal, said control voltage developing means being responsive to said picture control signal for adjusting said first and second levels of said control voltage for varying the conduction of said transistors and thereby said first, second and third intensity levels.

* * * * *